United States Patent
Bönisch et al.

(10) Patent No.: US 11,945,523 B2
(45) Date of Patent: Apr. 2, 2024

(54) SENSOR DEVICE AND METHOD FOR MONITORING THE COUPLING STATE OF A COUPLING ELEMENT

(71) Applicant: ETO MAGNETIC GmbH, Stockach (DE)

(72) Inventors: Benjamin Bönisch, Bodman-Ludwigshafen (DE); Helmut Schuster, Stockach (DE)

(73) Assignee: ETO MAGNETIC GMBH, Stockach (DE)

( * ) Notice: Subject to any disclaimer, the term of this patent is extended or adjusted under 35 U.S.C. 154(b) by 0 days.

(21) Appl. No.: 18/030,148

(22) PCT Filed: Oct. 8, 2021

(86) PCT No.: PCT/EP2021/077920
§ 371 (c)(1),
(2) Date: Apr. 4, 2023

(87) PCT Pub. No.: WO2022/074223
PCT Pub. Date: Apr. 14, 2022

(65) Prior Publication Data
US 2023/0331319 A1   Oct. 19, 2023

(30) Foreign Application Priority Data
Oct. 9, 2020   (DE) .................... 10 2020 126 534.4

(51) Int. Cl.
*B62D 53/08*   (2006.01)
*B60D 1/01*   (2006.01)
*B60D 1/64*   (2006.01)

(52) U.S. Cl.
CPC ......... *B62D 53/0842* (2013.01); *B60D 1/015* (2013.01); *B60D 1/64* (2013.01)

(58) Field of Classification Search
CPC ....... B62D 53/0842; B60D 1/015; B60D 1/64
See application file for complete search history.

(56) References Cited

U.S. PATENT DOCUMENTS

| 5,361,070 A | 11/1994 | Mcewan |
| 6,069,581 A | 5/2000 | Bell et al. |

(Continued)

FOREIGN PATENT DOCUMENTS

| DE | 69434064 T2 | 11/2004 |
| DE | 102004029130 A1 | 12/2005 |

(Continued)

OTHER PUBLICATIONS

International Search Report and Written Opinion on the Patentability of Application No. PCT/EP2021077920, dated Jan. 25, 2022, 8 pages.

(Continued)

*Primary Examiner* — Kevin Hurley
*Assistant Examiner* — Marlon A Arce
(74) *Attorney, Agent, or Firm* — Womble Bond Dickinson (US) LLP

(57) ABSTRACT

A sensor device for a monitoring of a coupling state of a coupling element, in particular a coupling bolt, preferably a kingpin, of a trailer, in particular a semitrailer, with a corresponding coupling element of a towing vehicle, in particular a semitrailer tractor, with at least one sensor which is at least configured for a recognition, in particular a detection, of a relative position of the coupling elements with respect to each other, wherein the sensor is realized as an ultra-wideband sensor.

19 Claims, 6 Drawing Sheets

(56) References Cited

U.S. PATENT DOCUMENTS

Figure 1:
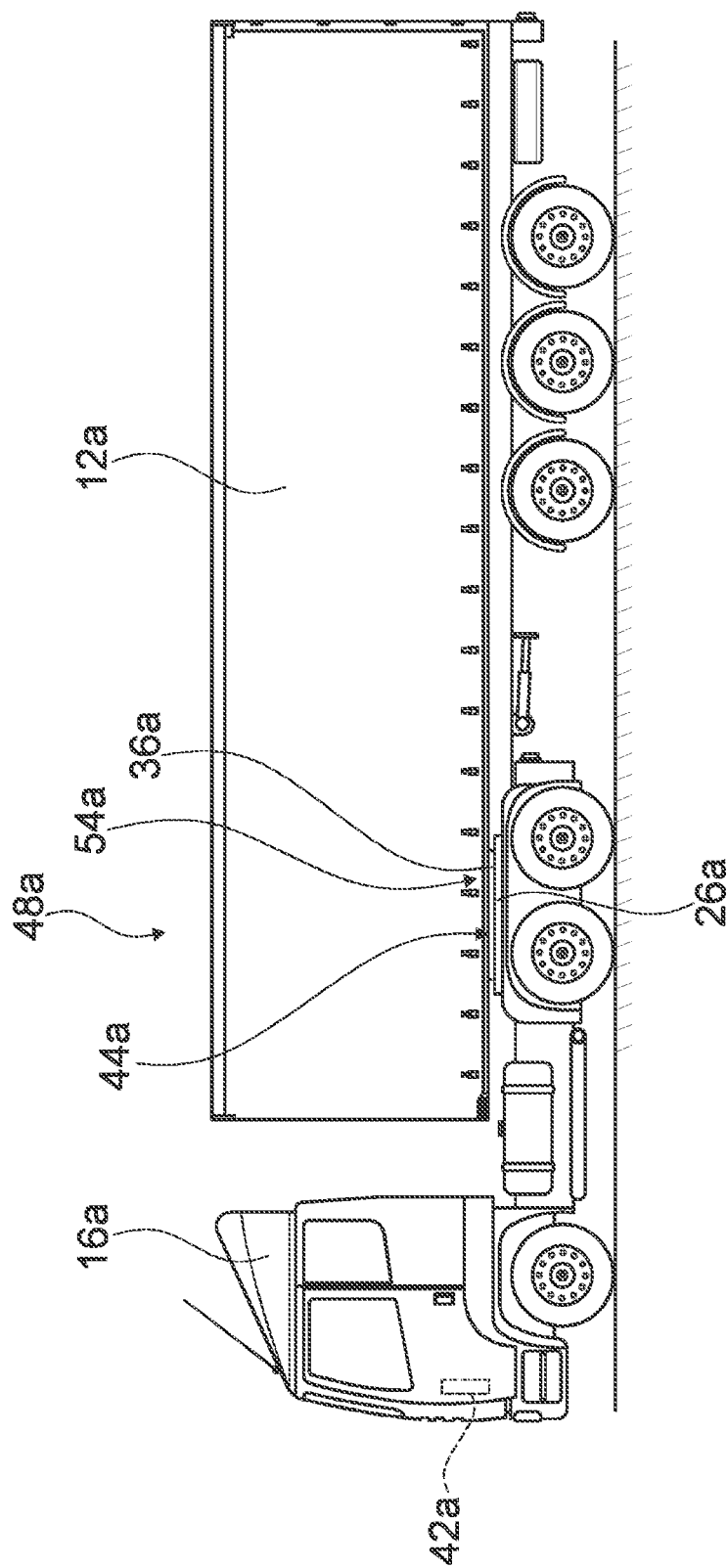

| | | | |
|---|---|---|---|
| 9,171,479 B2* | 10/2015 | Martin | G09B 9/042 |
| 11,392,141 B2* | 7/2022 | Dinh | B62D 15/0285 |
| 11,752,814 B1* | 9/2023 | Goetsch | B60P 3/40 |
| | | | 280/477 |
| 2006/0071447 A1 | 4/2006 | Gehring et al. | |
| 2015/0084311 A1* | 3/2015 | Van de Wetering | B60D 1/015 |
| | | | 280/446.1 |
| 2016/0260323 A1* | 9/2016 | Blekken | G08G 1/0133 |
| 2017/0287320 A1 | 10/2017 | Meade et al. | |
| 2018/0208187 A1 | 7/2018 | Lewis et al. | |
| 2018/0281679 A1 | 10/2018 | Lewis et al. | |
| 2018/0365509 A1 | 12/2018 | Naserian et al. | |
| 2019/0205024 A1 | 7/2019 | Lavoie | |
| 2019/0249479 A1 | 8/2019 | Lewis et al. | |
| 2019/0367107 A1* | 12/2019 | Grossman | B62D 53/125 |
| 2021/0171100 A1* | 6/2021 | Wulf | B60D 1/015 |
| 2021/0300136 A1* | 9/2021 | Algüera | B60D 1/015 |

FOREIGN PATENT DOCUMENTS

| | | |
|---|---|---|
| DE | 102017106565 A1 | 10/2017 |
| DE | 102018106842 A1 | 10/2018 |
| DE | 102018114730 A1 | 12/2018 |
| DE | 102019100024 A1 | 7/2019 |
| DE | 102019102989 A1 | 8/2019 |
| WO | 2007014333 A2 | 2/2007 |

OTHER PUBLICATIONS

German Search Report on the Patentability of Application No. DE 10 2020 126 534.4, dated May 7, 2021, 11 pages.

International Preliminary Report on Patentability for Application No. PCT/EP2021077920, dated Jan. 25, 2022, 8 pages.

PCT Written Opinion of the International Searching Authority for PCT/EP2021/077920 dated Jan. 25, 2022, 7 pages.

* cited by examiner

SENSOR DEVICE AND METHOD FOR MONITORING THE COUPLING STATE OF A COUPLING ELEMENT

CORRESPONDENCE TO RELATED APPLICATIONS

This patent application is based on and incorporates herein by reference the German patent application DE 10 2020 126 534.4, filed on Oct. 9, 2020 as well as the international patent application PCT/EP2021/077920, filed on Oct. 8, 2021.

Prior Art

The invention concerns a sensor device, a towing vehicle, an autonomously-driving traction engine, a trailer, a tractor-trailer combination and a method.

It has already been proposed that a coupling process between a semitrailer and a semitrailer tractor, more precisely between a kingpin and a coupling plate, is sensor-monitored. However, monitoring devices already known (e. g. inductive sensors or Hall sensors) require several distributedly-arranged sensors for a reliable recognition of a successful coupling/uncoupling, wherein the function of said sensors may moreover be impaired by a large amount of lubrication agent, which is distributed in the region of the kingpin and is often interspersed with metal chips.

The objective of the invention is in particular to provide a generic device having advantageous characteristics with regard to a monitoring of the coupling state between trailer and towing vehicle. The objective is attained according to the invention.

Advantages of the Invention

The invention is based on a sensor device for a monitoring of a coupling state of a coupling element, in particular a coupling bolt, preferably a kingpin, of a trailer, in particular a semitrailer, with a corresponding coupling element of a towing vehicle, in particular a semitrailer tractor, with at least one sensor which is at least configured for a recognition, in particular detection, of a relative position of the coupling elements with respect to each other, preferably a relative position of the coupling element and/or of the corresponding coupling element with respect to the sensor, in particular to a detection surface of the sensor.

It is proposed that the sensor is realized as an ultra-wideband sensor. This in particular allows attaining advantageous properties regarding the monitoring of the coupling state between the trailer and the towing vehicle. It is advantageously possible to achieve especially reliable recognition of the coupling state. Advantageously, using UWB technology, which is in particular only insubstantially affected by metal chips or lubrication agents, enables reliable recognition of the coupling state, even in the case of heavily soiled coupling elements. Advantageously, by using UWB technology reliable radar recognition of the coupling element is enabled even in the case of close spatial conditions (e. g. distances in the range of few centimeters). Advantageously, especially robust, fault-proof recognition of the coupling state is enabled. This in particular allows achieving advantageous suitability for autonomously-driving towing vehicles and/or traction engines. Moreover, especially simple recognition of the coupling state is achievable. Advantageously, it is possible to reduce a complexity of the sensor device for the recognition of the coupling state. It is advantageously possible to reduce a required number of sensors, in particular in comparison to existing sensor devices, as a result of which costs can be advantageously reduced.

In particular, the sensor device is configured to detect a coupled state of the coupling elements, in which the trailer is fastened to the towing vehicle in a loss-proof manner. In particular, the sensor device is configured to detect an uncoupled state of the coupling elements, in which the trailer is completely separate from the towing vehicle. The sensor device is moreover configured to detect a faulty and/or only partially coupled state of the coupling elements, in which the trailer is fastened to the towing vehicle in a non-secure manner, for example in a manner that is not loss-proof. In particular, the coupling element is fixedly mounted at the trailer. In particular, the coupling element is embodied as a kingpin (kingbolt), preferably as a 2-inch kingpin or as a 3.5-inch kingpin. In particular, for the purpose of reducing tribological effects, e. g. due to wobbling movements while driving through curves, the kingpin may be covered at least partially in a lubricating agent. In particular, for a fastening of the trailer to the towing vehicle, the coupling elements are configured to engage and/or latch into each other. In particular, in the coupled state the corresponding coupling element of the towing vehicle is configured to hold the coupling element of the trailer in a loss-proof manner. By a "towing vehicle" is in particular a motor-driven towing vehicle to be understood, which—with the exception of the persons and objects in a driver's cab, is itself not configured for transporting persons or goods. Preferably the towing vehicle is configured for pulling the trailer. However, it is of course also conceivable that the towing vehicle is configured, in addition to pulling the trailer, for transporting persons or goods. In particular, the towing vehicle is embodied as a traction engine, in particular as a semitrailer tractor. By a "trailer" is in particular a vehicle to be understood which has a loading area for transporting goods or persons but does not have a drive of its own, and which is configured to be taken along behind towing vehicles or traction engines. "Configured" is in particular to mean specifically programmed, designed and/or equipped. By an object being configured for a certain function is in particular to be understood that the object fulfills and/or executes this certain function in at least one application state and/or operation state.

The sensor device is preferably at least partially integrated in the towing vehicle and/or in the trailer. However, alternatively it is also conceivable that the sensor device, in particular the sensor, is realized separately from the towing vehicle and/or from the trailer, and/or that the sensor device, in particular the sensor, may be fastened releasably to the towing vehicle and/or to the trailer. It is thus advantageously conceivable that the sensor device, in particular the sensor, is retrofittable to the towing vehicle or to the trailer, and/or that coupling processes of towing vehicle-trailer combinations (tractor-trailer combinations) are monitored without an integrated monitoring option of the coupling state between the towing vehicle and the trailer. By a "sensor" is preferably a technical component to be understood which is capable of detecting at least one physical property, preferably several physical properties, of its environment. In particular, the sensor is configured to detect spatial objects, preferably objects in motion, in particular the coupling element of the trailer and/or a coupling dog of the corresponding coupling element, and/or to obtain information concerning physical properties of these objects, for example a relative position with respect to the sensor. In particular, the sensor has a field of vision within which the sensor is capable of sensing objects. Preferably, in addition to the recognition of objects in fast motion, the sensor is also capable of sensing objects in slow motion or in standstill.

By an "ultra-wideband sensor" is in particular a sensor to be understood which emits electromagnetic waves, in particular wave packets, wherein the emitted electromagnetic waves, in particular the emitted wave packets, cover an especially wide range, preferably a range of more than 500 MHz. In particular, the wave packets emitted by the ultra-wideband sensor comprise a plurality of electromagnetic waves having different frequencies, which preferably have a fix phase relation to each other. Preferably the ultra-wideband sensor is realized as an ultra-wideband radar sensor. In particular, the ultra-wideband sensor detects a reflection signal of the emitted electromagnetic waves, in particular the emitted wave packets, for a recognition of objects moved and/or arranged in the field of vision of the sensor. Preferably the ultra-wideband sensor detects a travel-time difference of the reflection signal, wherein in particular a distance of the reflecting object can be deduced from the travel-time difference. Advantageously, by increasing a range of a measuring signal it is possible to achieve increased measuring resolution—and thus a reduction of a distance of minimally distinguishable measuring distances—of a sensor. Preferably the ultra-wideband sensor is operated continuously. Preferably the ultra-wideband sensor does not send pulse signals, such that advantageously no interruption of a measurement is necessary for receiving impulse responses. This advantageously allows achieving an especially high measuring speed, which in particular permits high measuring accuracy and/or a measuring of objects having an especially high velocity. However, it is alternatively also conceivable that the ultra-wideband sensor is operated in a pulsed manner. Advantageously, using ultra-wideband sensor technology further allows preventing an influence and/or disturbance of other radio transmitting methods, in particular other narrow-band radio transmitting methods, like for example LoRa, 5G or WLAN (in particular 802.11p). "Configured" is in particular to mean specifically programmed, designed and/or equipped. By an object being configured for a certain function is in particular to be understood that the object fulfills and/or executes said certain function in at least one application state and/or operation state.

Furthermore, it is proposed that the sensor is configured for a recognition, in particular a detection, of a position of the coupling element that is arranged and/or in motion in the field of vision of the sensor, or of a position of the corresponding coupling element that is arranged and/or in motion in the field of vision of the sensor. In this way, in particular advantageous properties with regard to the monitoring of the coupling state between the trailer and the towing vehicle are achievable. In particular, in this case the sensor is moved together with the coupling element or with the corresponding coupling element. In particular, the sensor is configured to determine a distance of the coupling element arranged and/or in motion in the field of vision of the sensor from the sensor, or a distance of the corresponding coupling element arranged and/or in motion in the field of vision of the sensor from the sensor.

It is moreover proposed that the sensor is configured to detect a position of a coupling dog of the corresponding coupling element, in particular of a fifth-wheel plate of the corresponding coupling element, which is arranged and/or in motion in an, in particular further, field of vision of the sensor. This in particular allows achieving advantageous properties with regard to the monitoring of the coupling state between the trailer and the towing vehicle. Advantageously, especially reliable recognition of the coupling state of the corresponding coupling element is enabled. Advantageously, a high level of safety is attainable. In particular, the ultra-wideband sensor comprises at least one first sensor antenna. The first sensor antenna preferably has the field of vision which is oriented in a first direction. In particular, the ultra-wideband sensor comprises at least one second sensor antenna. The second sensor antenna preferably has the, in particular further, field of vision, which is oriented in a second direction. The field of vision of the first sensor antenna and the, in particular further, field of vision of the second sensor antenna are in particular oriented in different directions, preferably in opposed directions. Preferably the ultra-wideband sensor comprises two sensor antennae which are oriented in different directions, one of the sensor antennae monitoring the coupling element or the further coupling element and a further one of the sensor antennae monitoring the coupling dog of the corresponding coupling element. In particular, the sensor is configured to detect a position of the coupling dog relative to the coupling element, in particular the kingpin. In particular, the sensor is at least configured to detect, preferably distinguish, at least three operation states of the coupling dog. Herein preferably a first operation state is realized as a "coupling dog closed" operation state, in which the coupling dog is in particular in a securing position, in which a removal of the coupling element out of the coupling zone is prevented. Furthermore, herein a second operation state is preferably realized as a "coupling dog open" operation state, in which the coupling dog is in particular in an open position, in which a removal of the coupling element out of the coupling zone is enabled. Beyond this, herein a third operation state is preferably realized as "coupling dog in critical intermediate position" operation state, in which the coupling dog is in particular in a position that differs from the open position and from the securing position.

In particular, the ultra-wideband sensor is configured to detect at the same time a hitching height of the trailer relative to the towing vehicle, a position of the coupling element, in particular the kingpin, of the trailer in a coupling zone of the corresponding coupling element and a closure state of the coupling dog of the corresponding coupling element. As up to now at least one separate sensor was required for each of these parameters, it is thus now advantageously possible to reduce a number of sensors.

It is further proposed that the ultra-wideband sensor is based on an M-sequence technology. This advantageously allows achieving especially accurate movement recognition, in particular also with high movement speeds, of objects in motion in the field of vision of the sensor, preferably also in the case of especially small distances of the objects from the sensor. Advantageously, in particular in comparison with (UWB) impulse signals and/or with (UWB) sinusoidal signals, M-sequence signals have less noise. Advantageously, in particular in comparison with (UWB) impulse signals and/or with (UWB) sinusoidal signals, M-sequence signals are less interference-prone. Preferably, in particular in comparison with (UWB) impulse signals and/or with (UWB) sinusoidal signals, M-sequence signals cause little interference with other applications, e. g. narrowband radio applications like LoRa, 5G or WLAN (in particular 802.11p). Advantageously, in particular in comparison with (UWB) impulse signals and/or with (UWB) sinusoidal signals, M-sequence signals are only to a small extent influenced and/or disturbed by signals of other radio sources, for example narrowband radio applications like LoRa, 5G or WLAN (in particular 802.11p). Advantageously, the M-sequence signals allow simultaneous measuring over an entire (UWB) frequency band of the sensors, thus enabling several thousand measurings per second. An "M-sequence" is in particular to mean a pseudorandom binary sequence known under the special terms "maximum length sequence" or "sequence having maximum length". In particular, the M-sequence is a pseudorandom noise sequence. In particular, the M-sequence has a flat frequency spectrum, which is preferably similar to white noise. In particular, the ultra-wideband sensor is configured to generate and emit a signal, in particular a pseudorandom noise signal, based on the M-sequence and/or realized by an M-sequence. In particular, the M-sequence signal can be generated by feedback shift registers. In particular, the sensor module comprises at least one circuit for a generation of the M-sequence, which preferably comprises an N-stage shift register for the generation of the M-sequence. In particular, the ultra-wideband sensor comprises an emitting unit, which generates and emits an M-sequence emission signal. In particular, the electromagnetic waves emitted by the ultra-wideband sensor, in particular the wave packets emitted by the ultra-wideband sensor, form the M-sequence emission signal. Preferably, herein a pre-setting of the phase relations of the plurality of electromagnetic waves with different frequencies, in particular the wave packet, emitted by the ultra-wideband sensor, determines whether the emitted emission signal is a pulse signal or forms an M-sequence in the time interval. In particular, the ultra-wideband sensor comprises a receiving unit that receives portions of the M-sequence emission signal which are reflected by an object. In particular, the ultra-wideband sensor comprises an evaluation unit, which evaluates the received reflected M-sequence emission signal and determines at least a distance of the reflecting object on the basis of the received reflected M-sequence signal. Advantageously, the measuring and the measuring result of the ultra-wideband sensor with the M-sequence technology is at least substantially uninfluenced by fat, dirt and/or ice layers as well as rain and/or fog in the region of a measuring path of the ultra-wideband sensor.

It is moreover proposed that the ultra-wideband sensor works in a frequency band between 100 MHz and 6 GHz with a range of at least 500 MHz, preferably at least 1 GHz, preferentially at least 2 GHz, more preferably at least 4 GHz and particularly preferentially at least 5.5 GHz, and/or in a frequency band between 6 GHz and 8.5 GHz with a range of at least 500 MHz, preferably at least 1 GHz, preferentially at least 1.5 GHz, more preferably at least 2 GHz and particularly preferentially at least 2.5 GHz. This advantageously allows avoiding an, in particular mutual, interference of further radio sources like, for example, LoRa, 5G or WLAN (in particular 802.11p). Advantageously an especially high spatial resolution and/or an especially small measuring distance are/is achievable, in particular by the large range of the frequency band between 6 GHz and 8.5 GHz. Moreover, advantageously no radio transmission licenses are necessary for these frequency bands, in particular if a transmission power is in a range of −41.3 dbm/MHz. Preferably the transmission power of the ultra-wideband sensor is at −41.3 dbm/MHz or less. In particular, the frequency band between 100 MHz and 6 GHz and/or the frequency band between 6 GHz and 8.5 GHz are/is configured at least for a distance measuring, in particular also in a proximity of the sensor. It is in particular conceivable that the sensor module, in particular the sensor or at least two sensors of the sensor module, measures and/or is operated at least partially simultaneously or alternatingly in both frequency bands (100 MHz to 6 GHz and 6 GHz to 8.5 GHz).

If the utilizable field of vision of the sensor comprises a portion of a proximity of the sensor, in particular in addition to a remote region, secure and/or reliable monitoring of the coupling process is advantageously enabled, in particular also in the case of relatively high movement speeds of the coupling elements and close spatial conditions. In particular, this advantageously enables—preferably automated—driving of the towing vehicle during the coupling process. By a "utilizable field of vision" is in particular that portion of the field of vision of the sensor to be understood in which reliable distance measuring of objects in motion within the field of vision relative to the sensor is possible. "Reliable distance measuring" is in particular to mean a distance measuring with an accuracy of at least 5 cm, preferably at least 3 cm, preferentially at least 1.5 cm and particularly preferentially at least 0.5 cm. By a "proximity" is in particular, in this context, a region to be understood which is formed by points having a distance from the sensor, in particular from the emitting unit of the sensor and/or from the receiving unit, which is maximally 0.15 m, preferably maximally 0.1 m, advantageously no more than 0.05 m, preferentially no more than 0.03 m and particularly preferentially maximally 0.015 m. Advantageously the ultra-wideband sensor is capable of measuring in a region of the sensor in which conventional lidar and/or radar measuring devices are blind, in particular due to their finitely-extending transmission-pulse lengths and receive-pulse lengths.

It is further proposed that the utilizable field of vision of the sensor, in particular an antenna area of the sensor, has a minimum area extent of at least 1 cm×1 cm, preferably of at least 2 cm×2 cm, preferentially of at least 4 cm×4 cm, advantageously of at least 6 cm×6 cm and especially preferentially of maximally 8 cm×8 cm. This advantageously allows attaining especially reliable recognition of the coupling state, which for example enables a reliable discrimination of small metal chips present in the field of vision of the sensor. For example, reliable recognition of the real dimensions of a kingpin is achievable, even if the kingpin is covered in a lubricating layer interspersed with metal chips.

Beyond this, a sensor module completely comprising the sensor is preferably dimensioned in such a way that it can be integrated in a fifth-wheel plate, in a kingpin or in a kingpin plate. This advantageously facilitates simple incorporation in existing coupling components. Advantageously this allows integration in a limited available construction space. Advantageously high compactness of the sensor device is achievable. Advantageously re-designing the dimensions of already existing fifth-wheel plates, kingpins or kingpin plates is not necessary. As a result, high acceptancy and quick distribution are advantageously achievable. Preferably the sensor module, in particular a sensor housing surrounding the sensor, is dimensioned such that its maximum extension in at least two spatial directions, which are perpendicular to each other, is smaller than 15 cm, is preferably smaller than 10 cm and is preferentially smaller than 7 cm. Preferentially a smallest imaginary rectangular cuboid completely enclosing the sensor module, in particular the sensor housing, has at least two side edges which are perpendicular to each other and are smaller than 15 cm, are preferably smaller than 10 cm and are preferentially smaller than 7 cm. Preferentially the smallest imaginary rectangular cuboid completely enclosing the sensor module, in particular the sensor housing, is smaller than 15 cm×15 cm 15 cm, advantageously smaller than 12 cm×12 cm×12 cm, more preferably smaller than 10 cm×10 cm×10 cm, even more preferably smaller than 7 cm×7 cm×7 cm and particularly preferentially smaller than 5 cm×5 cm×5 cm.

In addition, it is proposed that the sensor is integrated in the towing vehicle, in particular in a fifth-wheel plate of the semitrailer tractor. In this way, in particular advantageous properties are attainable with regard to the monitoring of a coupling process carried out by the towing vehicle, in particular a coupling process carried out by an at least partially autonomously-driving traction engine. Advantageously, reliable and accurate monitoring of the coupling element of the trailer by the towing vehicle is enabled. Permanent monitoring of the coupling state of the corresponding coupling element, which is assigned to the towing vehicle, is advantageously achievable. In particular, the corresponding coupling element, preferably the fifth-wheel plate, implements a component of the sensor device by the integration of the sensor. In particular, the corresponding coupling element, which is assigned to the towing vehicle, forms the coupling zone, which is preferably configured to receive the coupling element of the trailer. In particular, the sensor is arranged in a proximity of the coupling zone. In particular, the sensor is integrated at least partially in a portion of the fifth-wheel plate that delimits the coupling zone and/or in a surface of the fifth-wheel plate that delimits the coupling zone. In particular, the sensor is arranged in a sub-region of the fifth-wheel plate that is situated opposite a horizontal opening of the coupling zone. In particular, the sensor is configured for monitoring the coupling zone. Preferably the field of vision of the sensor covers at least a large portion of the coupling zone. A "large portion" is to mean in particular at least 51%, preferably at least 66% and preferentially at least 80%.

It is further proposed that at least one part of the sensor, in particular at least one sensor antenna of the sensor, is integrated in a surface of the corresponding coupling element of the towing vehicle, which in a proper coupling state between the towing vehicle and the trailer is arranged opposite at least one surface of the coupling element of the trailer, in particular of a kingpin of the semitrailer, or opposite at least one surface of a holding plate which the coupling element of the trailer is fastened to, in particular opposite a king-pin plate of the semitrailer. In this way especially reliable recognition of the coupling state is achievable. For example, a field of vision of the first sensor antenna is oriented so as to enable a monitoring of the coupling zone. For example, a field of vision of the second sensor antenna is oriented so as to enable a monitoring of the coupling dog pivoting into and out of the coupling zone. For this the field of vision of the second sensor antenna is in particular oriented vertically downwards or vertically upwards. By an integration of a sensor part in a surface is in particular to be understood that the sensor part forms a portion of the surface, wherein preferably one or several protective layers and/or protective coverings, which cover the sensor part towards an outside, are assigned to the sensor part, in particular the sensor surface. A "proper coupling state" is in particular to mean, in this context, a state of a tractor-trailer combination in which the trailer is fastened to the towing vehicle in a loss-proof manner.

Alternatively or additionally, it is proposed that the sensor is integrated in the trailer, in particular in a kingpin or in a kingpin plate of the semitrailer of a semitrailer truck. In this way in particular advantageous properties are achievable with regard to the monitoring of a coupling process concerning the trailer, in particular a coupling process carried out by an at least partially autonomously-driving traction engine. Advantageously, reliable and accurate monitoring of an approach of the coupling element to the corresponding coupling element of the towing vehicle, in particular to the coupling zone of the fifth-wheel plate, is enabled. Advantageously, permanent monitoring of the coupling state of the coupling element assigned to the trailer is achievable. In particular, in this case by the integration of the sensor, the coupling element, preferably the kingpin, implements a component of the sensor device. In particular, the sensor is in this case integrated in a surface of the kingpin or of the kingpin plate. In particular, the sensor is in this case arranged on a sub-region of the surface of the kingpin that is situated peripherally in a radial direction (horizontal direction) or in a portion of the kingpin plate that points in a vertical direction downwards. In particular, the sensor is configured for monitoring a positioning of the corresponding coupling element in the coupling zone. In particular, the sensor is integrated in a surface of the coupling element of the trailer which is, in the proper coupling state between the towing vehicle and the trailer, arranged opposite at least one surface of the corresponding coupling element of the towing vehicle, in particular a fifth-wheel plate of the semitrailer truck.

Beyond this it is proposed that at least one measuring surface of the sensor that is integrated in the towing vehicle or in the trailer, preferably all measuring surfaces of the sensor, is/are embedded in the surface of the respective coupling element in such a way that the measuring surface of the integrated sensor is sunk relative to surfaces of the towing vehicle or of the trailer which surround the integrated sensor. This advantageously allows attaining a high degree of operational safety of the sensor device. Advantageously it is possible to reduce a damaging, for example damaging by abrasion, of the sensor, in particular of the surface of the sensor which forms the measuring surface and which cannot be made of a metal for operational reasons. In particular, the measuring surface is realized as the surface of the sensor via which the ultra-wideband measuring signal is emitted. In particular, the measuring surface is realized as the surface of the sensor via which the reflected ultra-wideband signal is then received. In particular, the first sensor antenna comprises a first measuring surface. In particular, the second sensor antenna comprises a second measuring surface, which is realized differently than the first measuring surface and/or is oriented differently than the first measuring surface. It is conceivable that the sensor comprises at least one third measuring surface which is, for example, assigned to a third sensor antenna that is oriented in a third direction, e. g. vertically upwards. In particular, the at least one measuring surface is sunk with respect to the surface of the towing vehicle, in particular the fifth-wheel plate, or of the trailer, in particular the kingpin or the kingpin plate, by at least 0.5 mm, preferably by at least 1 mm, advantageously by at least 2 mm, preferentially by at least 5 mm and preferentially by maximally 20 mm. During operation, a hollow caused by the sinking of the measuring surface may be filled with a lubrication agent, wherein advantageously the functionality of the UWB sensor remains at least substantially unaffected. The lubrication agent present in the hollow of the measuring surface may even serve to further augment a resistance against abrasion.

Furthermore, it is proposed that in a direction facing towards the field of vision, the sensor has a surface made of a non-conductive material, in particular a non-metallic material, preferably at least to a large extent made of a ceramic, of a glass and/or of a plastic. In this way, advantageously a high level of efficiency of the sensor measuring is achievable. Preferably the sensor housing of the sensor is made of the non-metallic material, at least in the region of the sensor antenna/antennae.

It is also proposed that the sensor device comprises a control and/or regulation unit, which is configured to evaluate a reflection signal of the ultra-wideband sensor and, depending on the evaluated reflection signal, to output a coupling confirmation signal, an uncoupling confirmation signal or a "coupling process under way" signal to the towing vehicle. Advantageously, in this way controlling of the at least partially autonomously-driving towing vehicle is enabled. Moreover, a high level of safety is thus advantageously achievable as faulty or incomplete couplings are easily recognizable. By a "control and/or regulation unit" is in particular a unit to be understood which comprises at least one control electronics component. A "control electronics component" is in particular to mean a unit with a processor unit, in particular a processor, and with a memory unit, in particular a storage medium, and with an operation program that is stored in the memory unit.

It is moreover proposed that the control and/or regulation unit is configured to evaluate a reflection signal of the ultra-wideband sensor, filtering out interference signals, for example interference signals generated by metal chips located between the coupling elements, in an automated manner. This advantageously allows achieving particularly reliable recognition of the coupling state, for example as a reliable discrimination of small metal chips present in the field of vision of the sensor is facilitated. In particular, the control and/or regulation unit searches the reflection signal for structures of a certain known dimension, approximately corresponding to a dimension of the object that is to be detected, for example the kingpin. Herein the control and/or regulation unit in particular searches the reflection signal for structures whose surface has approximately the same distance over a large range. For example, in a typical detection of a kingpin that is covered with lubricating agent containing metal chips, some percent, e. g. 3%, of the reflected data will relate to distributedly-arranged metal chips and 97% will relate to a contiguous portion of the kingpin or the kingpin plate. The control and/or regulation unit is configured to identify the metal chips and to ignore them when determining a position and/or a distance.

In addition, the towing vehicle, in particular the traction engine, preferably the semitrailer truck, is proposed, with the corresponding coupling element, which is preferably realized as a fifth-wheel plate, and with the sensor device that is integrated in the corresponding coupling element. This advantageously allows a simplification and/or an at least partial automatization of the coupling process.

Moreover, an at least partially autonomously-driving traction engine, in particular a semitrailer tractor, is proposed, with a corresponding coupling element that is preferably embodied as a fifth-wheel plate and with the sensor device that is integrated in the corresponding coupling element, wherein a propulsion of the at least partially autonomously-driving traction engine, in particular the semitrailer tractor, is blocked or released depending on the evaluation of the reflection signal of the ultra-wideband sensor by the control and/or regulation unit. This may advantageously enable a realization of an at least partially autonomous, preferably completely autonomous, coupling process. It is furthermore advantageously possible to ensure particular high traffic safety of the at least partially autonomously-driving traction engine. In particular, the propulsion of the at least partially autonomously-driving traction engine is blocked if the ultra-wideband sensor detects an incomplete or faulty coupling between the coupling element and the corresponding coupling element. In particular, the propulsion of the at least partially autonomously-driving traction engine is released if the ultra-wideband sensor detects a complete and/or proper coupling between the coupling element and the corresponding coupling element. For this the control and/or regulation unit in particular communicates with an on-board computer of the at least partially autonomously-driving traction engine. Alternatively, it is also conceivable that the control and/or regulation unit is embodied integrally with the on-board computer of the at least partially autonomously-driving traction engine. By two units being embodied "partially integrally" is in particular to be understood that the units have at least one common element, in particular at least two, advantageously at least three common elements, which is/are (a) component/s, in particular (a) functionally relevant component/s, of both units. By a "partially autonomous traction engine" is in particular a traction engine to be understood which, at least for time intervals or in at least one driving mode, for example a parking mode or a coupling and/or uncoupling mode for a coupling and/or uncoupling of a trailer, is capable of driving and steering without the influence of a human driver. It is further conceivable that the towing vehicle is realized as a completely autonomously-driving traction engine.

Alternatively or additionally, the trailer, in particular the semitrailer, is proposed, with the coupling element which preferably comprises the kingpin and the kingpin plate, and with the sensor device which is integrated in the coupling element, in particular in the kingpin or in the kingpin plate. This advantageously allows a simplification and/or at least partial automatization of the coupling process.

Furthermore, a tractor-trailer combination, in particular a semitrailer truck, is proposed, with the towing vehicle or with the at least partially autonomously-driving traction engine and with the trailer, the trailer and/or the towing vehicle comprising the sensor device. This advantageously allows a simplification and/or at least partial automatization of the coupling process.

Beyond this a method is proposed for a monitoring of the coupling state of the coupling element, in particular a coupling bolt, preferably the kingpin, of the trailer, in particular the semitrailer, with the corresponding coupling element of the towing vehicle, in particular the semitrailer tractor, the method comprising a detection step in which a position of the coupling element, which is arranged and/or in motion in the field of vision of the sensor, is detected or in which a position of the corresponding coupling element, which is arranged and/or in motion in the field of vision of the sensor, is detected, the position of the coupling element or the position of the corresponding coupling element being detected in the detection step by the sensor that is realized as an ultra-wideband sensor. This in particular allows attaining advantageous characteristics with regard to the monitoring of the coupling state between the trailer and the towing vehicle. Advantageously, particularly reliable recognition of the coupling state is achievable. Advantageously, utilization of the UWB technology, which is in particular only insubstantially affected by metal chips or lubricating agents, enables reliable recognition of the coupling state even in the case of heavily soiled coupling elements.

The sensor device according to the invention, the towing vehicle according to the invention, the autonomously-driving traction engine according to the invention, the trailer according to the invention, the tractor-trailer combination according to the invention, and the method according to the invention shall herein not be limited to the application and implementation described above. In particular, in order to fulfill a functionality that is described here, the sensor device according to the invention, the towing vehicle according to the invention, the autonomously-driving traction engine according to the invention, the trailer according to the invention, the tractor-trailer combination according to the invention, and the method according to the invention may comprise a number of individual elements, components, method steps and units that differs from a number given here.

DRAWINGS

Further advantages will become apparent from the following description of the drawings. In the drawings two exemplary embodiments of the invention are illustrated. The drawings, the description and the claims contain a plurality of features in combination. Someone skilled in the art will purposefully also consider the features individually and will find further expedient combinations.

Figure 2:
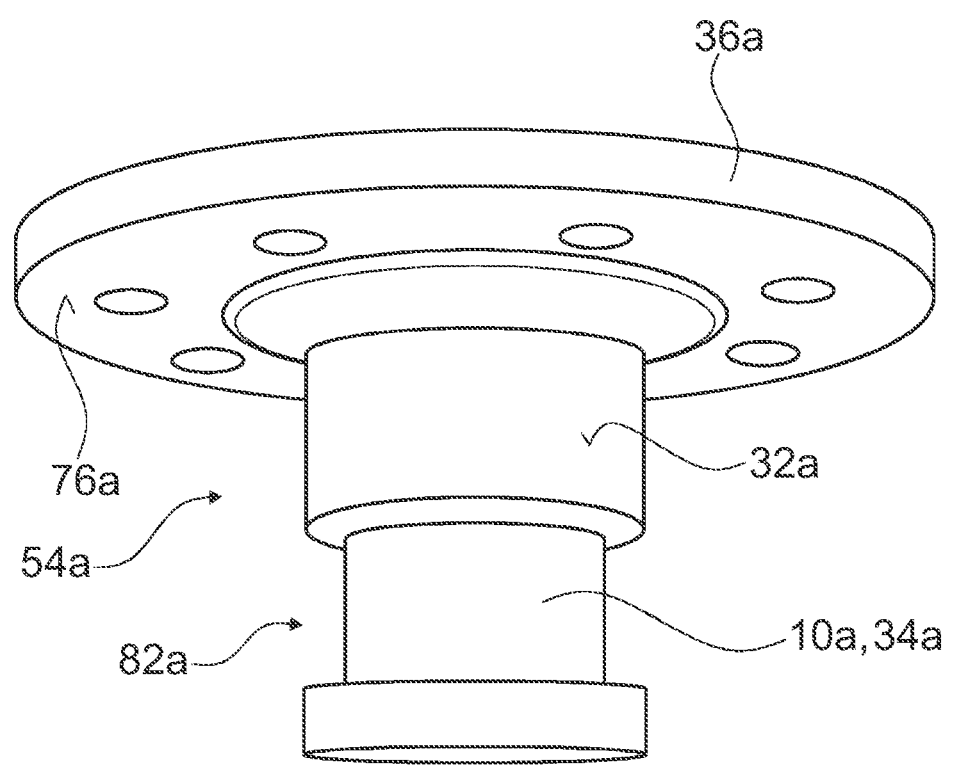
Figure 3A:
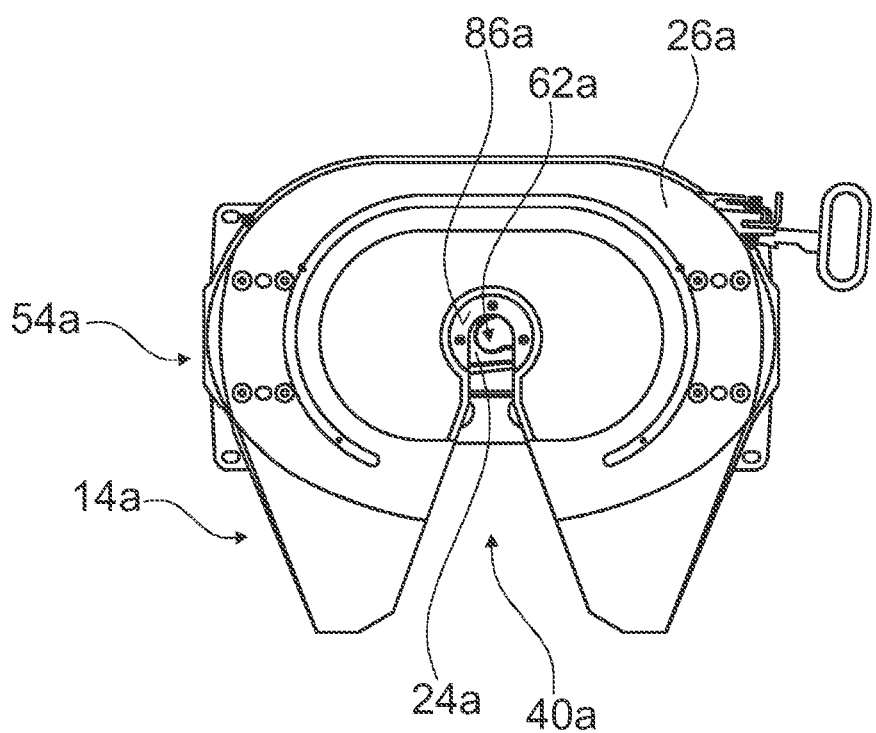
Figure 3B:
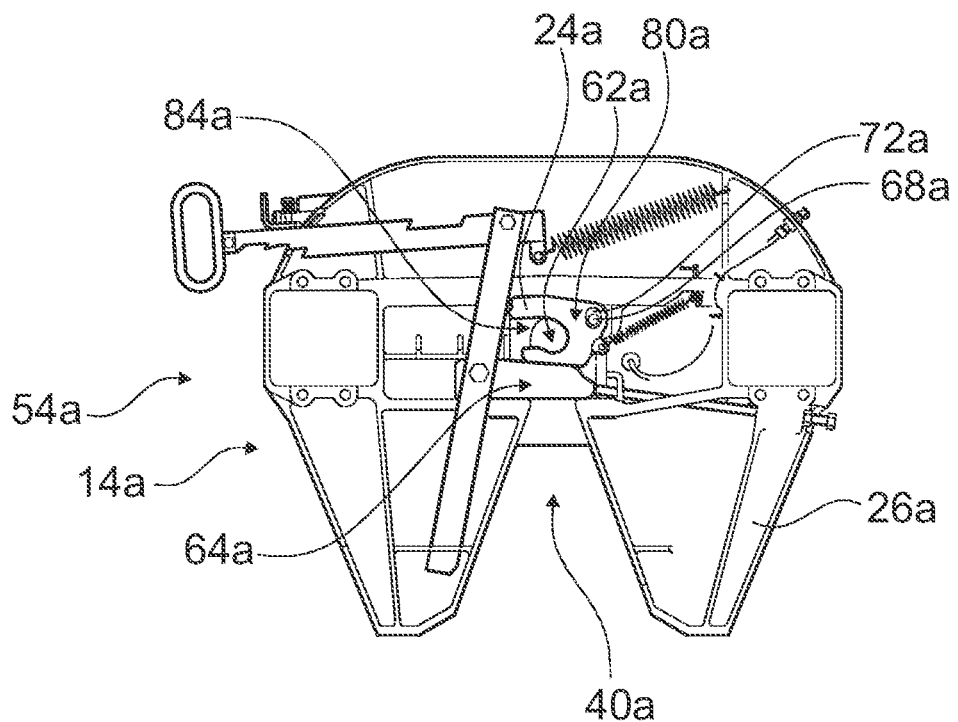
Figure 4:
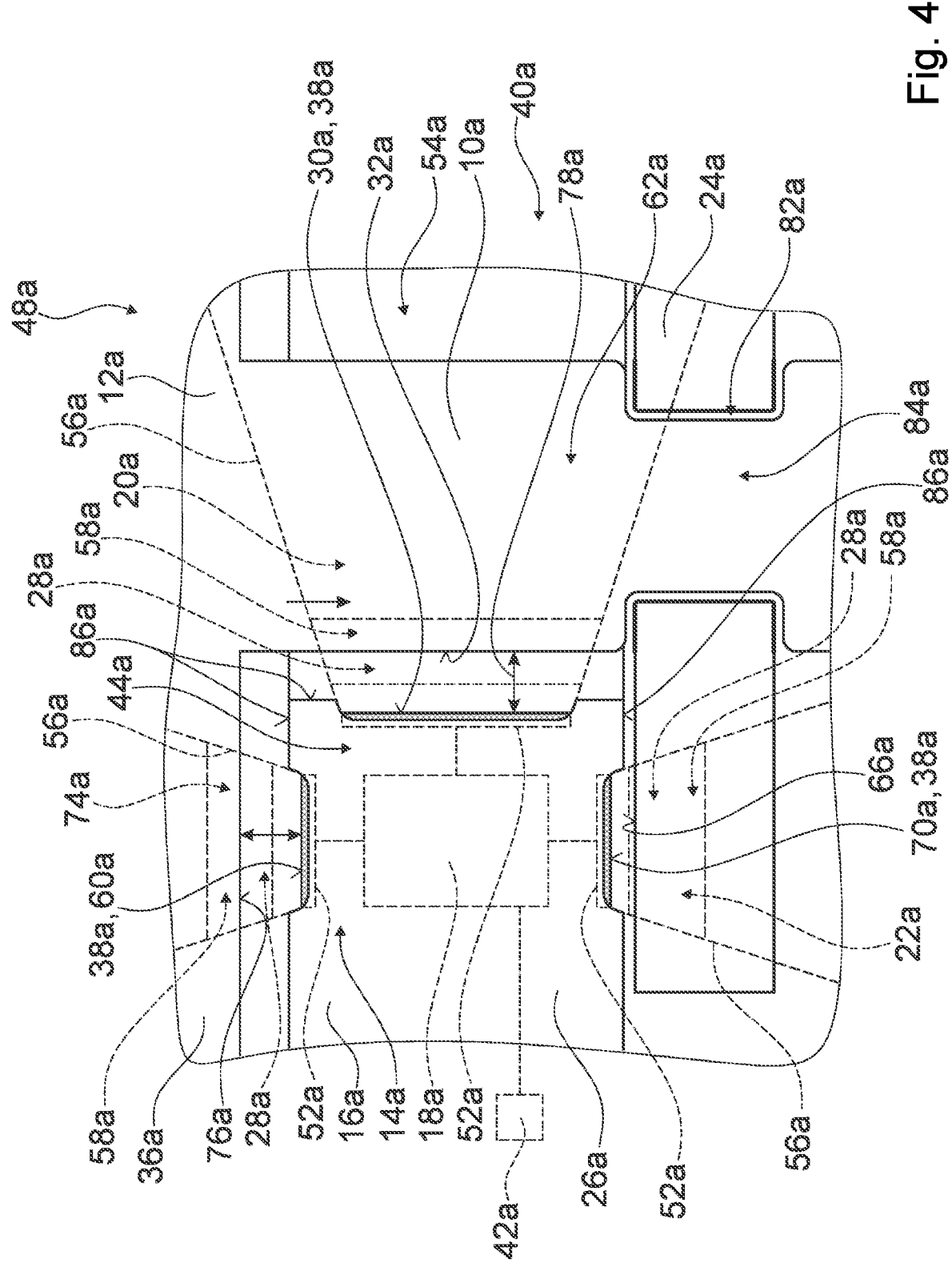
Figure 5:
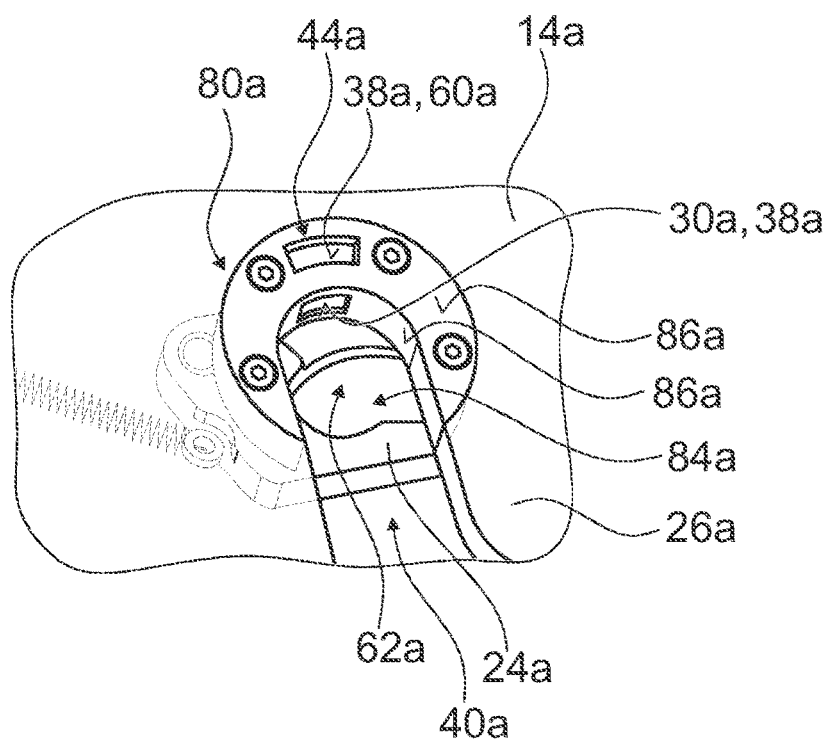
Figure 6:
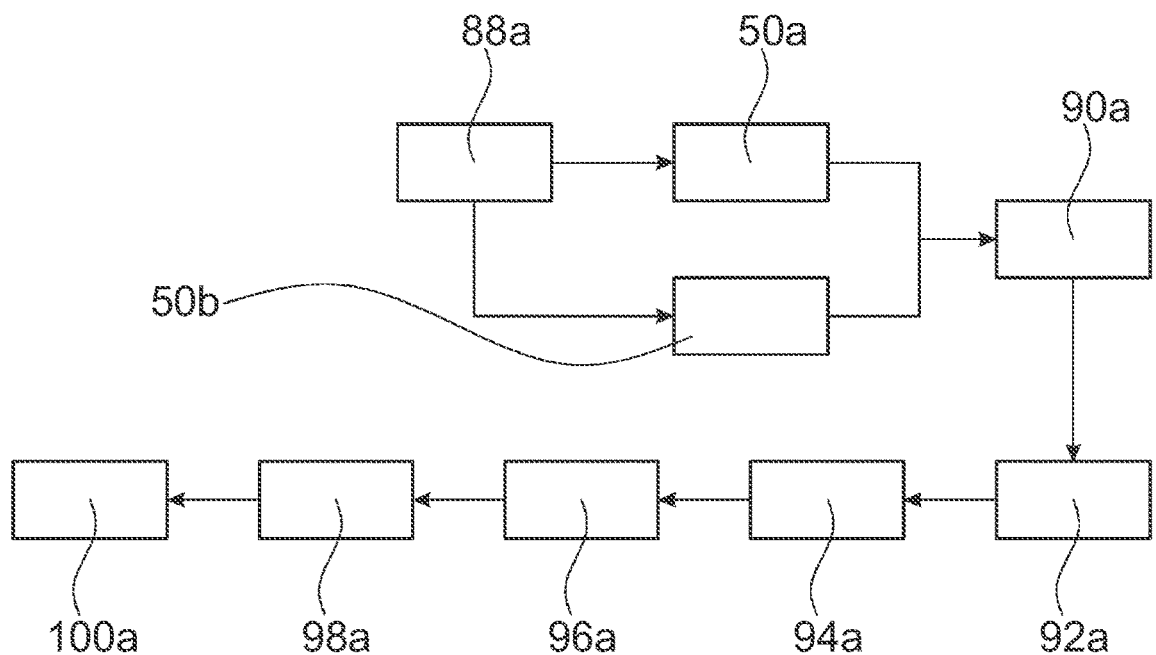
Figure 7:
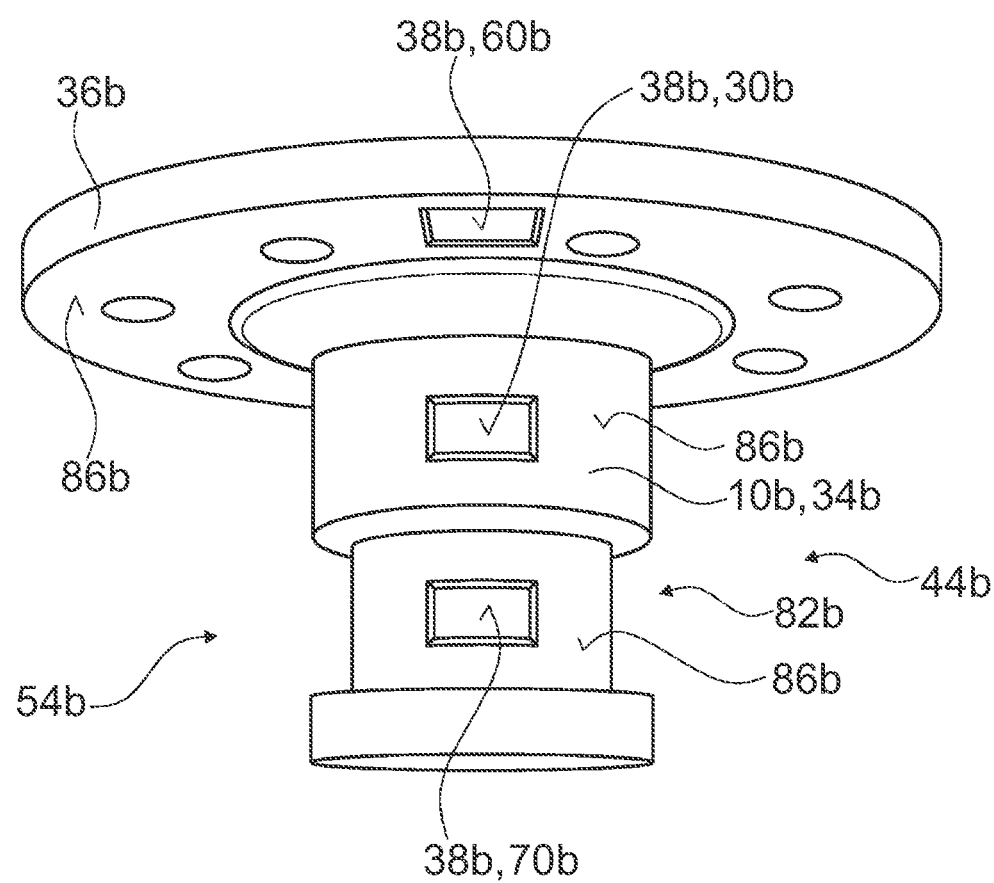

It is shown in:

FIG. 1 a tractor-trailer combination with a trailer and with a towing vehicle,

FIG. 2 a schematic illustration of a coupling element of the trailer,

FIG. 3a a schematic illustration of a front side of a corresponding coupling element of the towing vehicle, FIG. 3b a schematic illustration of a rear side of the corresponding coupling element of the towing vehicle, FIG. 4 a schematic, partially sectional view of a sub-region of the coupling elements of the tractor-trailer combination, with a sensor device, FIG. 5 a further schematic perspective view of a portion of the corresponding coupling element which surrounds a coupling zone of the corresponding coupling element, FIG. 6 a flow chart of a method for monitoring the coupling state, and FIG. 7 an alternative coupling element of an alternative trailer, with an alternative sensor device.

DESCRIPTION OF THE EXEMPLARY EMBODIMENTS

FIG. 1 shows a tractor-trailer combination 48a with a trailer 12a and a towing vehicle 16a. The tractor-trailer combination 48a is realized as a semitrailer truck. The trailer 12a is embodied as a semitrailer. The towing vehicle 16a is embodied as a semitrailer tractor. The towing vehicle 16a is realized as a partially autonomously-driving traction engine. It is also conceivable that the towing vehicle 16a is realized as a fully autonomously-driving traction engine.

The partially autonomously-driving traction engine comprises a control and/or regulation unit 42a. The control and/or regulation unit 42a is configured for controlling, preferably blocking or releasing, a propulsion of the at least partially autonomously-driving traction engine depending on signals outputted by a sensor device 44a.

The trailer 12a comprises a coupling element 10a (cf. FIG. 2). The coupling element 10a of the trailer 12a is embodied as a kingpin 34a. The coupling element 10a of the trailer 12a is fastened to the trailer 12a via a holding plate 36a. The holding plate 36a is embodied as a kingpin plate. The coupling element 10a is configured for creating a coupled state between the trailer 12a and the towing vehicle 16a. The coupling element 10a forms part of a fifth-wheel coupling 54a. The towing vehicle 16a comprises a corresponding coupling element 14a (cf. FIGS. 3a and 3b). The corresponding coupling element 14a is realized as a fifth-wheel plate 26a. The corresponding coupling element 14a is configured for creating the coupled state between the trailer 12a and the towing vehicle 16a. The corresponding coupling element 14a forms part of the fifth-wheel coupling 54a. The coupling element 10a is configured to interact with the corresponding coupling element 14a for creating the coupled state. The corresponding coupling element 14a forms a coupling zone 62a. For creating a proper coupling state, the coupling zone 62a is configured to at least partially receive and/or at least partially encompass the coupling element 10a. The coupling zone 62a has a side opening 40a. The coupling element 10a is introducible sideways into the coupling zone 62a through the side opening 40a of the coupling zone 62a, and/or is removable sideways from the coupling zone 62a through the side opening 40a of the coupling zone 62a. The coupling element 10a and the corresponding coupling element 14a are movable relative to each other via a horizontal movement, in particular a driving movement, of the towing vehicle 16a or of the trailer 12a.

The fifth-wheel coupling 54a is configured for a connection between the towing vehicle 16a and the trailer 12a. The fifth-wheel coupling 54a is configured for receiving a substantial portion of a weight of the trailer (semitrailer) 12a. The fifth-wheel coupling 54a is configured, in the coupled state, to define a maneuvering space of the trailer 12a relative to the towing vehicle 16a. The fifth-wheel coupling 54a is configured, in the coupled state, to receive thrust, pull and roll forces of the trailer 12a.

FIG. 4 shows a schematic, partially sectional illustration of a sub-region of the coupling elements 10a, 14a of the tractor-trailer combination 48a. The tractor-trailer combination 48a comprises the sensor device 44a. The sensor device 44a is configured for monitoring a coupling state of the coupling element 10a of the trailer 12a with the corresponding coupling element 14a of the towing vehicle 16a. The sensor device 44a comprises a sensor 18a. The sensor device 44a, in particular the tractor-trailer combination 48a, is preferably free of further sensors monitoring the coupling state. The sensor 18a is at least configured for a recognition and/or detection of a relative position of the coupling elements 10a, 14a with respect to each other. The sensor 18a is embodied as an ultra-wideband sensor. The ultra-wideband sensor uses an M-sequence technology. The ultra-wideband sensor works in a frequency band between 100 MHz and 6 GHz with a range of at least 500 MHz. The ultra-wideband sensor furthermore, or alternatively, works in a frequency band between 6 GHz and 8.5 GHz with a range of at least 500 MHz.

In the exemplary embodiment illustrated in FIGS. 1 to 5, the sensor 18a is assigned to the towing vehicle 16a of the tractor-trailer combination 48a. In the exemplary embodiment illustrated in FIGS. 1 to 5, the sensor 18a is integrated in the corresponding coupling element 14a of the towing vehicle 16a of the tractor-trailer combination 48a. The sensor 18a is in this case integrated in the fifth-wheel plate 26a of the towing vehicle 16a. The sensor 18a comprises sensor antennae 52a. Each sensor antenna 52a of the sensor 18a has a field of vision 56a (cf. FIG. 4). The fields of vision 56a form detection regions of the sensor antennae 52a of the sensor 18a. The fields of vision 56a comprise sub-regions delimiting utilizable fields of vision 20a, 22a, 74a. The utilizable fields of vision 20a, 22a, 74a in each case form such portions of the fields of vision 56a in which reliable detection, in particular distance detection, by the sensor 18a is possible. The utilizable fields of vision 20a, 22a, 74a of the sensor 18a have an area extent of at least 3 cm×3 cm. The utilizable fields of vision 20a, 22a, 74a of the sensor 18a embodied as an ultra-wideband sensor comprise a portion of the proximity 28a of the sensor 18a. The proximity 28a of the sensor 18a is realized by that region of the field of vision 56a which is spaced apart from the sensor antenna 52a by only a few centimeters. In the case described by way of example, the proximity 28a of the sensor 18a is realized as that region of the fields of vision 56a of the sensor 18a which is spaced apart from the respective sensor antenna 52a by maximally 5 cm. In the case described by way of example, the utilizable fields of vision 20a, 22a, 74a in each case comprise a sub-region 58a of the respective proximity 28a, which extends from a peripheral end of the proximity 28a as far as a minimum distance of about 0.5 cm from the respective sensor antenna 52a.

In the case shown in FIGS. 1 to 5, the sensor 18a is configured to detect a position of the coupling element 10a that is arranged and/or in motion in the field of vision 20a of the sensor 18a. The sensor 18a is in this case configured to detect a distance 78a of the coupling element 10a, which is arranged and/or in motion in the field of vision 20a of the sensor 18a, from the sensor 18a. The sensor 18a is further configured to detect a movement speed of the coupling element 10a that is in motion in the field of vision 20a of the sensor 18a. A portion of the sensor 18a, in particular at least one of the sensor antennae 52a, is integrated in a surface 30a of the corresponding coupling element 14a of the towing vehicle 16a. The portion of the surface 30a covered by the sensor antenna 52a thus forms a measuring surface 38a. In a proper coupling state between the towing vehicle 16a and the trailer 12a, the surface 30a, in which the portion of the sensor 18a, in particular the sensor antenna 52a, is integrated, is arranged opposite at least one surface 32a of the coupling element 10a of the trailer 12a. In this way a position of the coupling element 10a in the coupling zone 62a of the corresponding coupling element 14a is detected.

A further portion of the sensor 18a, in particular at least a further one of the sensor antennae 52a, is integrated in a further surface 60a of the corresponding coupling element 14a of the towing vehicle 16a. The portion of the further surface 60a covered by the sensor antenna 52a thus forms a measuring surface 38a. In a proper coupling state between the towing vehicle 16a and the trailer 12a, the further surface 60a, in which the further portion of the sensor 18a, in particular the further sensor antenna 52a, is integrated, is arranged opposite at least one surface 76a of the holding plate 36a to which the coupling element 10a of the trailer 12a is fastened, in particular the kingpin plate of the semitrailer. In this way a height position of the holding plate 36a, in particular a hitching height of the trailer 12a, is detected during the coupling process and in the coupled state.

The corresponding coupling element 14a comprises a coupling dog 24a (cf. FIGS. 3a to 4). The coupling dog 24a is configured to at least partially engage around the coupling element 10a in the coupled state. The coupling element 10a has a groove 82a that runs in a circumferential direction. The coupling dog 24a is configured to grip the coupling element 10a in a region of the groove 82a. The coupling dog 24a forms a gripping opening 84a, which is dimensioned such that the coupling element 10a can engage around it only in the region of the groove 82a. Outside the region of the groove 82a, a diameter of the coupling element 10a is too large for the coupling dog 24a. The coupling dog 24a is configured for a securing of the coupling element 10a in the coupled state. The coupling dog 24a is supported movably. In an uncoupled state, the coupling dog 24a is in an open position (not shown), which permits unimpeded insertion of the coupling element 10a into the coupling zone 62a. In a coupled state, the coupling dog 24a is in a securing position 80a, which prevents a removal of the coupling element 10a out of the coupling zone 62a (cf. for example FIG. 3B). In the coupled state the securing position 80a is locked. The corresponding coupling element 14a has a locking mechanism 64a (cf. FIG. 3B). The coupling dog 24a is supported so as to be movable, in particular horizontally movable, preferably horizontally pivotable. The locking mechanism 64a is configured to prevent or release the movability and/or the pivotability of the coupling dog 24a. The locking mechanism 64a is actuatable manually and/or automatedly, for example by means of the control and/or regulation unit 42a. In the coupling process, the coupling element 10a is moved toward the coupling zone 62a until the coupling element 10a hits on the coupling dog 24a, which is then pivoted. In the pivoting, the coupling dog 24a rotates via a deflected bolt 68a. As soon as the coupling dog 24a has reached a position provided for the proper coupling, the bolt 68a engages in a recess 72a of the coupling dog 24a and thus the coupling dog 24a is secured in this position. The locking mechanism 64a additionally secures the coupling dog 24a against the occurring loads. In the uncoupling process the locking mechanism 64a and the bolt 68a are released, such that the coupling dog 24a can be rotated out of the position provided for the proper coupling and the coupling element 10a is thus removable out of the coupling zone 62a.

The sensor 18a is configured to recognize and/or detect a position and/or a movement of the coupling dog 24a. The sensor 18a comprises a sensor antenna 52a, whose field of vision 22a is oriented such that a position and/or a movement of the coupling dog 24a, preferably with respect to the coupling element 10a, is detected. An additional further portion of the sensor 18a, in particular at least an additional further one of the sensor antennae 52a, is integrated in an additional further surface 70a of the corresponding coupling element 14a of the towing vehicle 16a. The portion of the additional further surface 70a covered by the sensor antenna 52a thus forms a measuring surface 38a. The additional further surface 70a, in which the additional further portion of the sensor 18a, in particular the additional further sensor antenna 52s, is integrated, is arranged opposite at least one surface 66a of the movably supported coupling dog 24a. In this way an instantaneous position of the coupling dog 24a is detected.

The sectional view of the corresponding coupling element 14a shown in FIG. 4, shows that the measuring surfaces 38a of the sensor 18a are embedded in the respective surfaces 30a, 60a, 70a of the corresponding coupling element 14a in such a way that the measuring surfaces 38a of the sensor 18a are sunk relative to surfaces 86a surrounding the measuring surfaces 38a. The measuring surfaces 38a are sunk by about 1 mm relative to the surrounding surfaces 86a. The measuring surfaces 38a form surfaces 30a, 60a, 70a of the sensor 18a which in each case face toward the fields of vision 20a, 22a, 74a. The surfaces 30a, 60a, 70a of the sensor 18a facing toward the fields of vision 20a, 22a, 74a are in each case implemented of a non-conductive material, in particular of a non-metallic material. Surfaces 30a, 60a, 70a of the sensor 18a which face toward the fields of vision 20a, 22a, 74a are in each case made of a ceramic, of a glass and/or of a plastic.

The sensor 18a is configured to communicate with the control and/or regulation unit 42a. The control and/or regulation unit 42a is configured to evaluate a reflection signal of the ultra-wideband sensor. The control and/or regulation unit 42a is configured for outputting a coupling confirmation signal, an uncoupling confirmation signal or a "coupling process under way" signal to the towing vehicle 16a, depending on the evaluated reflection signal. The control and/or regulation unit 42a is configured to control the towing vehicle 16a depending on the signal determined by the sensor 18a. The control and/or regulation unit 42a is configured to block or release a propulsion of the at least partially autonomously-driving traction engine depending on the evaluation of the reflection signal of the ultra-wideband sensor. The control and/or regulation unit 42a is configured, when evaluating the reflection signal of the ultra-wideband sensor, to automatedly filter out interference signals, which may for example be generated by metal chips arranged between the coupling elements 10a, 14a and embedded in lubrication grease.

FIG. 5 shows a further schematic perspective view of a section of the corresponding coupling element 14a surrounding the coupling zone 62a, in which a possible arrangement of the measuring surfaces 38a is illustrated.

FIG. 6 shows a flow chart of a method for monitoring the coupling state of the coupling element 10a of the trailer 12a with the corresponding coupling element 14a of a towing vehicle 16a. In at least one method step 88a the coupling dog 24a is in the open position and the towing vehicle 16a is moved towards the coupling element 10a of the trailer 12a with the sidewise opening 40a that is oriented in the travel direction. In at least one detection step 50a, a position of the coupling element 10a is detected, which is arranged and/or in motion in the field of vision 20a, 74a of the sensor 18a. However, it is of course also possible, in an alternative detection step 50b, to detect a position of the corresponding coupling element 14b, which is arranged and/or in motion in the field of vision 20b of the sensor 18b. Herein the position of the coupling element 10a, 10b or the position of the corresponding coupling element 14a, 14b is detected by the sensor 18a, 18b embodied as an ultra-wideband sensor in the detection step 50a, 50b. In at least one further method step 90a, the position of the coupling dog 24a of the corresponding coupling element 14a, which is arranged and/or in motion in the further field of vision 22a of the sensor 18a, is detected. In at least one further method step 92a, the signal detected by the sensor 18a is transmitted (in wireless or wire-bound fashion) to the control and/or regulation unit 42a for processing. In at least one further method step 94a, interference signals are automatically filtered out during the evaluation of the sensor signals. In the method step 94a, among others, interference signals are filtered out in an automated manner, which are generated by metal chips located between the coupling elements 10a, 14a. In at least one further method step 96a, the autonomously-driving traction engine is controlled depending on the signal determined by the sensor 18a. In at least one further method step 98a, a coupling confirmation signal, an uncoupling confirmation signal or a "coupling process under way" signal is outputted to the towing vehicle 16a depending on the evaluation of the control and/or regulation unit 42a. In at least one further method step 100a, upon receipt of the coupling confirmation signal a travel release is given for the autonomously-driving traction engine.

In FIG. 7 a further exemplary embodiment of the invention is illustrated. The following description and the drawing are essentially limited to the differences between the exemplary embodiments, wherein regarding components having the same denomination, in particular regarding components having the same reference numerals, principally the drawings and/or the description of the other exemplary embodiment, in particular of FIGS. 1 to 6, may be referred to. In order to distinguish between the exemplary embodiments, the letter a has been added to the reference numerals of the exemplary embodiment in FIGS. 1 to 6. In the exemplary embodiment of FIG. 7 the letter a has been substituted by the letter b.

FIG. 7 shows an alternative coupling element 10b of an alternative trailer 12b with an alternative sensor device 44b. The sensor device 44b comprises a sensor 18b, which is embodied as an ultra-wideband sensor. The sensor 18b is integrated in the trailer 12b. The sensor 18b is integrated in the coupling element 10b. The sensor 18b is integrated in a kingpin 34b of the trailer 12b. The sensor 18b is integrated in a holding plate 36b of the coupling element 10b. The sensor 18b is configured for a recognition and/or detection of a position of a corresponding coupling element 14b, which is arranged and/or in motion in a field of vision 20b of the sensor 18b.

REFERENCE NUMERALS 10 coupling element
12 trailer
14 corresponding coupling element
16 towing vehicle
18 sensor
20 utilizable field of vision
22 utilizable field of vision
24 coupling dog
26 fifth-wheel plate
28 proximity
30 surface
32 surface
34 kingpin
36 holding plate
38 measuring surface
40 opening
42 control and/or regulation unit
44 sensor device
48 tractor-trailer combination
50 detection step
52 sensor antenna
54 fifth-wheel coupling
56 field of vision
58 sub-region
60 surface
62 coupling zone
64 locking mechanism
66 surface
68 bolt
70 surface
72 recess
74 utilizable field of vision
76 surface
78 distance
80 securing position
82 groove
84 gripping opening
86 surface
88 method step
90 method step
92 method step
94 method step
96 method step
98 method step
100 method step

The invention claimed is:

1. A sensor device for a monitoring of a coupling state of a coupling element, in particular a coupling bolt, preferably a kingpin, of a trailer, in particular a semitrailer, with a corresponding coupling element of a towing vehicle, in particular a semitrailer tractor, with at least one sensor which is at least configured for a recognition, in particular a detection, of a relative position of the coupling elements with respect to each other, wherein the sensor is realized as an ultra-wideband sensor, the sensor device comprising a control and/or regulation unit, which is configured to evaluate a reflection signal of the ultra-wideband sensor and, depending on the evaluated reflection signal, to output a coupling confirmation signal, an uncoupling confirmation signal or a "coupling process under way" signal to the towing vehicle.

2. The sensor device according to claim 1, wherein the sensor is configured for a recognition of a position of the coupling element which is arranged and/or in motion in a field of vision of the sensor, or of a position of the corresponding coupling element which is arranged and/or in motion in the field of vision of the sensor.

3. The sensor device according to claim 1, wherein the sensor is configured to detect a position of a coupling dog of the corresponding coupling element, in particular a fifth-wheel plate of the corresponding coupling element, which is arranged and/or in motion in an, in particular further, field of vision of the sensor.

4. The sensor device according to claim 1, wherein the ultra-wideband sensor is based on an M-sequence technology.

5. The sensor device according to claim 1, wherein the ultra-wideband sensor works in a frequency band between 100 MHz and 6 GHz with a range of at least 500 MHz, and/or in a frequency band between 6 GHz and 8.5 GHz with a range of at least 500 MHz.

6. The sensor device according to claim 1, wherein the utilizable field of vision of the sensor comprises at least a portion of a proximity of the sensor.

7. The sensor device according to claim 1, wherein the utilizable field of vision of the sensor has an area extent of at least 1 cm×1 cm, preferably of at least 2 cm×2 cm, preferentially of at least 4 cm×4 cm.

8. The sensor device according to claim 1, wherein the sensor is integrated in the towing vehicle, in particular in a fifth-wheel plate of the semitrailer tractor.

9. The sensor device according to claim 8, wherein at least a part of the sensor is integrated in a surface of the corresponding coupling element of the towing vehicle (16a), which in a proper coupling state between the towing vehicle and the trailer is arranged opposite at least one surface of the coupling element of the trailer, in particular a kingpin of the semitrailer, or opposite at least one surface of a holding plate which the coupling element of the trailer is fastened to, in particular a kingpin plate of the semitrailer.

10. The sensor device according to claim 1, wherein the sensor is integrated in the trailer, in particular in a kingpin or in a kingpin plate of the semitrailer of a semitrailer truck.

11. The sensor device according to claim 1, wherein at least one measuring surface of the sensor that is integrated in the towing vehicle or in the trailer is embedded in the surface of the respective coupling element in such a way that the measuring surface of the integrated sensor is sunk relative to surfaces surrounding the integrated sensor.

12. The sensor device according to claim 1, wherein in a direction facing towards the field of vision, the sensor has a surface made of a non-conductive material, in particular a non-metallic material, preferably at least to a large extent of a ceramic, of a glass and/or of a plastic.

13. The sensor device according to claim 1, comprising a control and/or regulation unit, which is configured to evaluate a reflection signal of the ultra-wideband sensor, filtering out interference signals, for example interference signals generated by metal chips located between the coupling elements, in an automated manner.

14. A towing vehicle, in particular a traction engine, preferably a semitrailer tractor, with a corresponding coupling element which is preferably realized as a fifth-wheel plate, and with the sensor device according to claim 1, which is integrated in the corresponding coupling element.

15. An at least partially autonomously-driving traction engine, in particular semitrailer tractor, with a corresponding coupling element which is preferably realized as a fifth-wheel plate and with a sensor device according to claim 13, which is integrated in the corresponding coupling element, wherein a propulsion of the at least partially autonomously-driving traction engine, in particular the semitrailer tractor, is blocked or released depending on the evaluation of the reflection signal of the ultra-wideband sensor by the evaluation unit.

16. A trailer, in particular a semitrailer, with a coupling element which preferably comprises a kingpin and a kingpin plate, and with a sensor device according to claim 1, which is integrated in the coupling element, in particular in the kingpin or in the kingpin plate.

17. A tractor-trailer combination, in particular a semitrailer truck, with the towing vehicle according to claim 14.

18. A method for a monitoring of a coupling state of a coupling element, in particular a coupling bolt, preferably a kingpin, of a trailer, in particular a semitrailer, with a corresponding coupling element of a towing vehicle, in particular a semitrailer tractor, with a detection step in which a position of the coupling element, which is arranged and/or in motion in a field of vision of a sensor, is detected or in which a position of the corresponding coupling element, which is arranged and/or in motion in the field of vision of the sensor is detected, wherein the position of the coupling element or the position of the corresponding coupling element is detected in the detection step by a sensor that is realized as an ultra-wideband sensor, and wherein a control and/or regulation unit evaluates a reflection signal of the ultra-wideband sensor and, depending on the evaluated reflection signal, outputs a coupling confirmation signal, an uncoupling confirmation signal or a "coupling process under way" signal to the towing vehicle.

19. A sensor device for a monitoring of a coupling state of a coupling element, in particular a coupling bolt, preferably a kingpin, of a trailer, in particular a semitrailer, with a corresponding coupling element of a towing vehicle, in particular a semitrailer tractor, with at least one sensor which is at least configured for a recognition, in particular a detection, of a relative position of the coupling elements with respect to each other, wherein the sensor is realized as an ultra-wideband sensor, and wherein the ultra-wideband sensor is based on an M-sequence technology.

* * * * *